United States Patent [19]
Frank

[11] 3,805,071
[45] Apr. 16, 1974

[54] PROGRAMMING APPARATUS FOR AN AUTOMATIC RADIOACTIVITY COUNTING SYSTEM

[75] Inventor: Richard B. Frank, Deerfield, Ill.

[73] Assignee: Nuclear-Chicago Corporation, Des Plaines, Ill.

[22] Filed: May 8, 1972

[21] Appl. No.: 251,510

Related U.S. Application Data

[63] Continuation of Ser. No. 789,791, Jan. 8, 1969, abandoned.

[52] U.S. Cl. ............................................. 250/328
[51] Int. Cl. ............................................. G01t 1/20
[58] Field of Search ............. 250/106 SC, 71.5, 328

[56] References Cited
UNITED STATES PATENTS
3,604,935  9/1971  Nather .......................... 250/106 SC

*Primary Examiner*—James W. Lawrence
*Assistant Examiner*—Davis L. Willis
*Attorney, Agent, or Firm*—Walter C. Ramm; Charles H. Thomas, Jr.; Helmuth A. Wegner

[57] ABSTRACT

Sample group programming apparatus including a binary coded program indicating plug mounted over a first-to-be-counted sample in a sample group and reading apparatus positioned relative to the sample transfer station. A binary coded disc and light conducting arrangement on a support member comprise the program indicating plug and a light source and a number of light responsive elements comprise the reading apparatus.

9 Claims, 7 Drawing Figures

INVENTOR
Richard B. Frank
BY Lowell C. Bergstedt
ATTORNEY

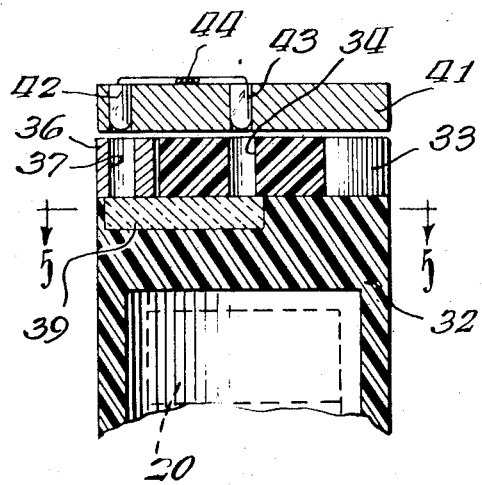
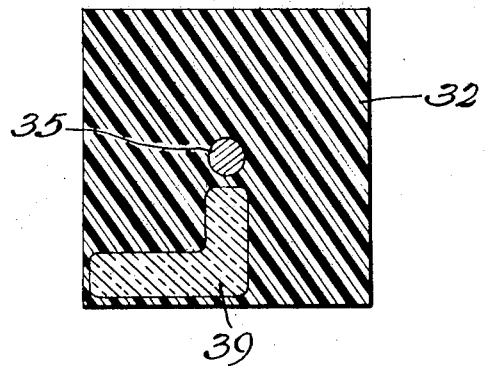
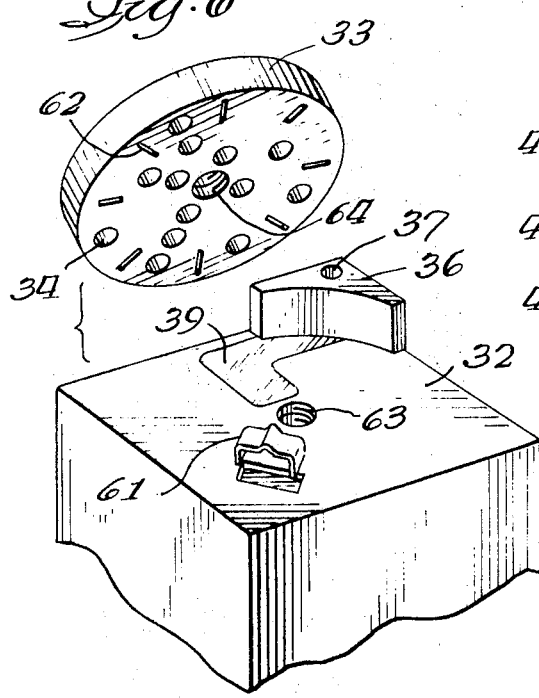
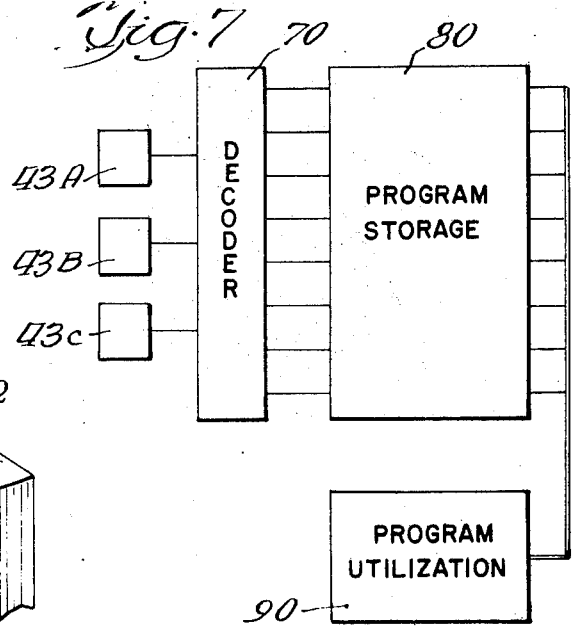

PROGRAMMING APPARATUS FOR AN AUTOMATIC RADIOACTIVITY COUNTING SYSTEM

This is a continuation of application Ser. No. 789,791, filed Jan. 8, 1969 and now abandoned.

An automatic liquid scintillation counting system typically includes sample storage and conveying apparatus for transporting a relatively large number of samples one-at-a-time to a sample transfer station, sample transfer apparatus for transferring individual samples between the sample transfer station and a sample counting station, sample counting apparatus associated with the sample counting station, and control apparatus for automatically programming the above functions in an appropriate manner. The sample storage and conveying apparatus may have a capacity of several hundred samples, and the sample counting apparatus may include three or more analysis channels with associated scaler-timers. In addition, the system may include calculating and printing apparatus for performing arithmetic operations on and providing a printed record of selected counting data.

Typically, at least several groups of samples will be placed in the sample storage and conveying apparatus, and different counting parameters and programs may be required for each group of samples. (This situation may arise when a single experimenter is conducting a variety of different experiments and, more typically, when a group of individual experimenters are using the same system.) Thus, for each sample group, particular settings of the controls associated with the sample counting apparatus are appropriate. The discriminators in each of the pulse height analysis channels must be set to appropriate levels; the scaler-timer associated with each channel must be set for a preset count or preset time, low count reject, and background subtract; the calculator must be set to calculate one or more external standard channels ratios or sample channels ratios; and the printing controls must be set to print out appropriate information. If an operator were required continuously or frequently to attend the system in order to alter the control settings for the next sample group, the capability of the system to function in an unattended fashion would be at least partly destroyed. In order for the system to operate completely unattended, some facility for programming the sample counting apparatus for each particular sample group is required.

It is the principal object of this invention to provide an improved automatic liquid scintillation counting system.

More particularly, it is an object of this invention to provide an improved sample group programming apparatus for an automatic liquid scintillation counting system.

It is another object of this invention to provide sample group programming apparatus which is flexible as to the locations of particular sample groups and the number of individual samples within those groups.

The improved sample group programming apparatus of this invention is employed in a system in which the sample counting apparatus includes a facility for storing a plurality of numbered counting programs. The improved sample group programming apparatus comprises an indicating means which can be mounted on the conveying apparatus over a first-to-be-counted sample of a particular group of samples and indicates a program number associated with that sample group, and a reading means which is mounted in a preselected position near the sample transfer station for reading the indicating means when it arrives in a reading position and for signalling the program number thereon to the sample counting apparatus.

In accordance with a preferred embodiment of this invention, the indicating means is a program indicating plug which includes a light opaque binary coded disc horizontally mounted over the first-to-be-counted sample. The binary coded disc has a plurality of binary coded decimal numbers defined thereon by an arrangement of radially disposed apertures. The presence or absence of an aperture at a preselected radial distance along a particular radius of the disc defines a respective 1 or 0 in the binary number system. The binary coded disc is carried on a support structure which mounts over the first-to-be-counted sample and is indexed in a fixed orientation on the sample conveying apparatus to be in a proper orientation when it arrives at the reading position. A light conducting element is mounted in the support structure with a portion of the element underneath a portion of the binary coded disc to conduct light from a remote location on the support structure to an operate location. A particular radial portion of the disc is always positioned over the light conducting element, but the disc is rotatably mounted on the support structure so that various radial portions thereon can be selectively positioned in the operate location.

Also in accordance with the preferred embodiment of this invention, the reading means includes a support member extending horizontally over a program indicating plug arriving at the sample transfer station with a light source and a number of light responsive elements mounted on the support member to provide light to the light conducting element on the program indicating plug and to detect light passing through apertures of the binary coded disc in an operate location. The number of light responsive elements is equal to the number of binary digits in the binary code on the disc. The positions of the light source and the light responsive elements are such that they register with corresponding operative elements on the program indicating plug when it is in a reading location underneath the horizontal support member. The horizontal support member may be mounted in a cantilevered fashion so as to provide clearance thereunder for any type of sample conveying apparatus.

The binary coded disc of the program indicating plug is readily capable of defining eight binary coded decimal numbers by utilizing a three binary digit code. This invention, however, is not limited to a particular number of binary coded decimal numbers or any particular number of binary digits. The diameter of each of the light responsive elements employed in the reading means and the requiremnt of preventing cross-talk between adjacent locations of binary digits on the coded discs are the only limitations on the number of binary coded decimal numbers that can be provided on a coded disc which is of an appropriate diameter for employment in a liquid scintillation counting system.

The indicating means and reading means according to this invention provide flexibility of counting programming of different groups of liquid scintillation samples. The various sample groups may be located anywhere on the sample conveying apparatus with programming being provided by mounting a program indicating plug over the first-to-be-counted sample in each group. Because the program indicating plug mounts over a sample no reduction in the sample handling capacity of the system is involved. The structure of the program indicating plug together with the structure of the reading apparatus provides a compact sample group programming system which can be adapted for use with any type of sample conveying apparatus. The cantilevered suspension of the light source and light sensitive elements above the sample conveying apparatus is particularly advantageous if samples are carried on trays having more than one row of samples thereon. The binary coding of the program number indication enables the coded disc to carry a relatively large number of program numbers for its size.

Other objects, features and advantages of this invention will be apparent from a consideration of the following detailed description in conjunction with the accompanying drawings in which:

FIG. 4 is a section view taken along the lines 4—4 in FIG. 1.

FIG. 5 is a section view taken along the lines 5—5 in FIG. 4;

FIG. 6 is an exploded assembly view of a portion of a program indicating plug in accordance with this invention; and FIG. 7 is a block schematic diagram illustrating the output utilization of the sample group programming apparatus of this invention.

Figure 1:
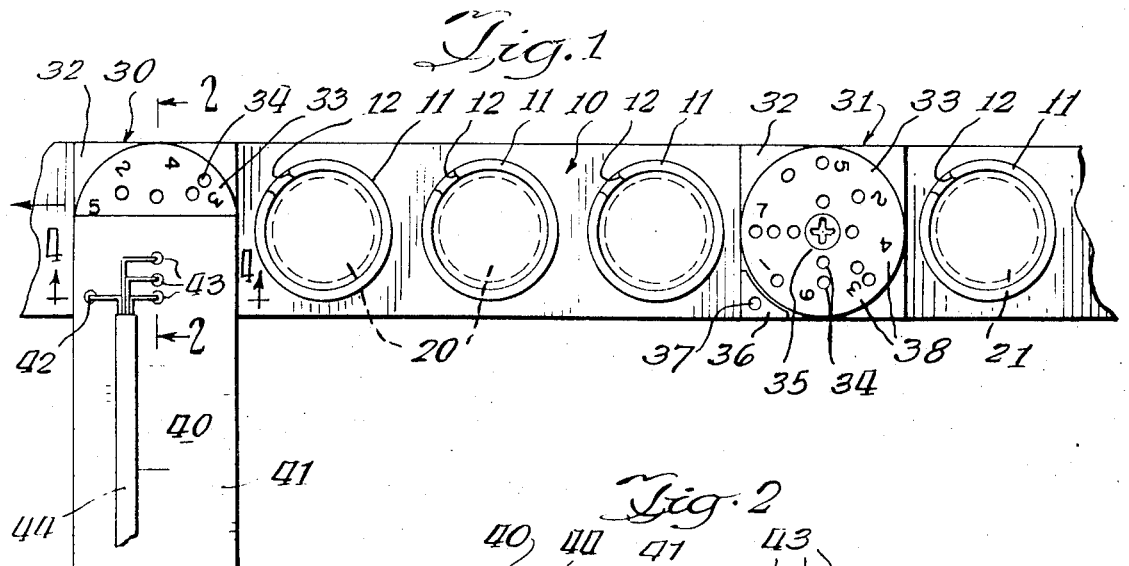
FIG. 1 is a partly schematic drawing of programming apparatus in accordance with this invention.

In FIG. 1 the sample conveying apparatus is shown as a single row, sample conveyor 10 which carries a plurality of sample receiving receptacles 11. This sample conveyor, of which only a portion is shown, may be of the particular construction shown in Meder et al. U.S. Pat. No. 3,206,006. A program indicating plug 30 is shown in a reading position underneath reading apparatus 40. A second program indicating plug 31 is shown at a different location on conveyor 10. Program indicating plug 30 is associated with a group of four samples designated by the numeral 20 referring to dashed line indications of liquid scintillation samples in receptacles 11. Program indicating plug 31 is associated with samples designated 21 of which one is under the program indicating plug and a second is in the receptacle 11 following. It should be understood, of course, that the number of samples associated with each program indicating plug is not fixed since the program indicating plugs may be mounted at any location on conveyor 10.

The structure of the program indicating plug and of the reading apparatus will now be described in conjunction with FIGS. 1 through 6. The primary elements of program indicating plug 30 are a hollow support member 32, a binary coded disc 33, both of which may be constructed of nylon or plastic, and a light conducting element 39 which may be of lucite. Support member 32 has a generally square cross section with a cylindrically hollow interior which permits the support member to be mounted over a sample receptacle 11 even though a liquid scintillation sample 20 is in the receptacle. A key or ridge 65 cooperates with a keyway or slot 12 in sample receptacle 11 to provide for the mounting of support member 32 in a fixed orientation on conveyor 10.

Binary coded disc 33 is mounted in a rotatable fashion on top of support member 32 by a central mounting screw 35. An array of apertures 34 through disc 33 provide the binary coded decimal information thereon. Instead of apertures and opaque solid areas, a combination of solid light transmissive and light opaque portions could be used. As can be seen in FIG. 1, eight binary coded decimal numbers in a sequence from 0 to 7 may be provided by appropriately providing apertures through disc 33 along regularly spaced radial portions. Decimal number indicia 38 corresponding to each binary coded radial portion may be provided to eliminate the need for the operator of the system to understand the decimal equivalent of each binary number.

The particular arrangement of apertures shown in FIG. 1 is merely by way of example since many other equivalent arrays could be provided. This particular array was chosen to provide spacing of the apertures in a balanced fashion, particularly around central portions of the disc.

Light conducting element 39, as best seen in FIGS. 5 and 6, conducts light from a location on support member 32 beside disc 33 to a particular operate location under disc 33. It should be apparent that the shape of light conducting element 39 which is shown in this particular embodiment is not the only possible shape since almost any configuration which would provide for the conducting of light under a radial portion of disc 33 would provide an operable structure. Some separation between the point of light entry into light conducting element 39 and the nearest possible aperture in an operate location should be provided to prevent cross-talk during the reading operation as will be described more fully later. Since coded disc 33 is rotatably mounted on support element 32, any of its radial portions may be selected for positioning in the operate location defined by the light conducting element 39. A detent arrangement comprised of detent spring 61 shown in FIG. 6 mounted on the top of support member 32 together with corresponding slot 62 in the underside of coded disc 33 provides for detented indexing of appropriate radial portions of disc 33 in the operate location and ensures that the position of disc 33 will be maintained while the program indicating plug is transported around on the sample conveying apparatus.

A corner post 36 with an aperture 37 therethrough may be provided on support member 32 to collimate light directly into light conducting elements 39. The presence of this apertured post is not critical to the operation of the program indicating plug, but it aids in preventing false signalling through light cross-talk.

Figure 2:
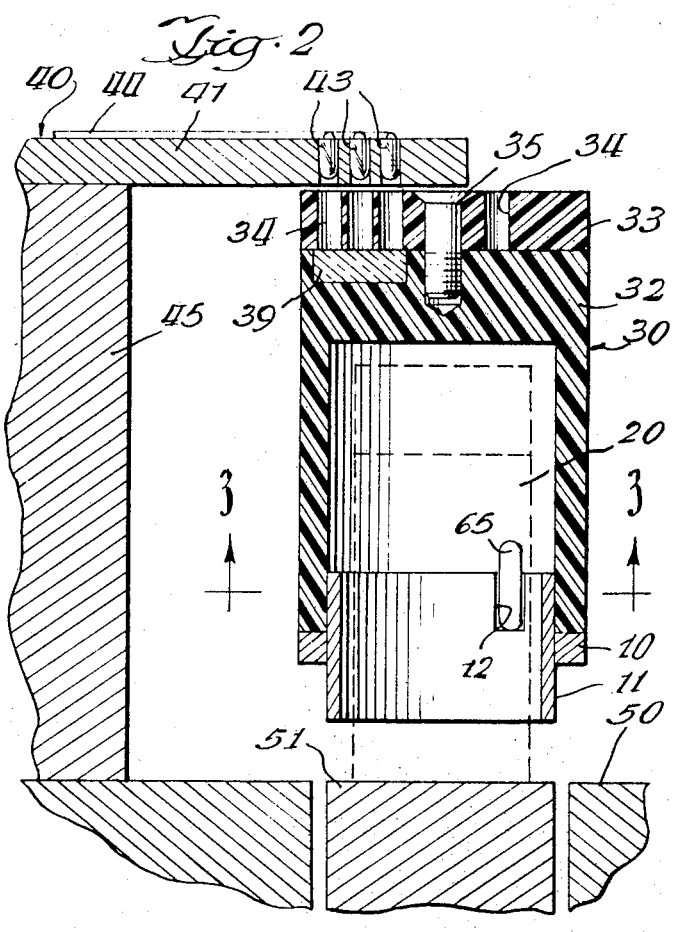
FIG. 2 is a partly sectioned elevational view taken along the lines 2—2 in FIG. 1.
Figure 3:
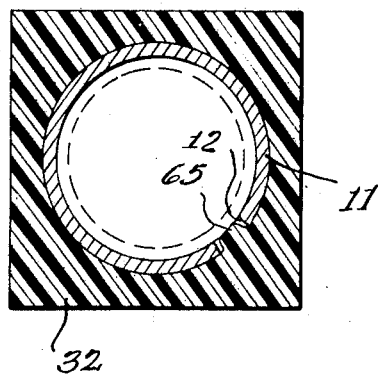
FIG. 3 is a section view taken along the lines 3—3 in FIG. 2.

As best shown in FIG. 2, reading apparatus 40 includes a horizontal support member 41 supported in a cantilevered fashion by a vertical support member 45. Three light responsive elements 43 are shown mounted in horizontal support member 41 in locations corresponding to operate locations of apertures in coded disc 33 when a program indicating plug is in a reading position under support member 41. Light source 42 which may be a neon light or a simple incandescent light or even a solid state element such as a gallium arsenide photodiode is mounted in support member 41 in a location to shine light into light conducting element 39 when a program indicating plug is in an reading position. Circuit connections to light conducting elements 43 and light source 42 are made by way of a cable 44 mounted on support member 41.

As shown in FIG. 2 light responsive elements 43 individually respond to light emanating from a corresponding aperture in coded disc 34 if an aperture is present in axial registration with that particular light responsive element. In FIG. 2 only one aperture exists in the operate location so only one of the light responsive elements is illuminated. Various types of light responsive elements may be employed such as photodiodes, phototransistors or photoresistors. The manner in which electrical connections are made to these various types of light responsive elements to enable them to detect which apertures in which locations on coded disc 33 are present in the operate position is well known to those familiar with this art. The signals from these light responsive elements are, of course, also in a binary form. Since eight different combinations of three binary digits each may be signalled by reading apparatus 40, up to eight programs may be selected by appropriately locating radial portions of coded disc 33 in an operate position and bringing the disc to a reading position under reading apparatus 40. It should be understood that light source 42 and light responsive elements 43 could be continuously energized with discrimination provided at the output of light responsive elements 43 between light levels existing merely from reflected light and those light levels produced by illumination coming through apertures in a properly positioned program indicating plug. Alternatively, a sensing switch could be provided for turning on the reading apparatus only when a program indicating plug has arrived at a reading location.

As shown in FIG. 2, the reading location whereat reading apparatus 40 is positioned is directly at the sample transfer station defined by a sample elevator 31 which functions to lower a sample, such as sample 20, beneath sample table 50. This sample transfer apparatus may be that shown in Meeder et al. U.S. Pat. No. 3,163,756. It is well known that such apparatus lowers samples into a counting chamber where, typically, a pair of phototubes detects scintillations in the sample. The details of the counting station and counting circuitry are not shown here since they are in many commercially available systems in different forms and thus well known to those familiar with this art. It should be understood that the reading location need not be directly above the sample transfer station, but it could just as well be in any location preceeding this station if appropriate storage is provided for the program number indicated until the first-to-be-counted sample in the group arrives at the sample transfer station.

In FIG. 7 a particular system for using program number indications is illustrated. The numbers 43A, 43B and 43C designate electrical systems associated with one of the three light responsive elements for indicating which of the three elements are energized in a particular reading operation. The three digit binary coded signals from these three electrical systems may be decoded in a well-known binary-to-decimal decoder 70 to provide an electrical signal on a unique one of eight output leads from decoder 70. Each of the eight output leads from decoder 70 provides an input to a particular numbered program in program storage apparatus 80. Depending on which of the eight input leads is operative its associated program will be provided to a program utilization apparatus 90. Program storage apparatus 80 may take any one of many forms. For example, program storage apparatus 80 could comprise up to eight separate arrays of switches and control elements associated with the various counting and calculating functions of the system. By utilizing this type of program storage, a great degree of flexibility is obtained since each set of controls may be readily changed. In addition, the settings on these controls are immediately apparent to anyone wishing to examine the parameters of the particular numbered program. However, it should be understood that program storage apparatus 80 could comprise a read-only memory or any other known equipment for storing information concerning parameters to be used in counting liquid scintillation samples. The manner of utilization of program information is, of course, dependent upon the type of program storage, and the manner of selecting numbered programs is also dependent upon the manner in which such programs are stored. If the program storage apparatus comprises a plurality of separate arrays of control knobs and switches, program selection can be accomplished by selecting an appropriate one of the arrays for connection to the counting system equipment. This can be implemented by utilization of various arrangements of electro-mechanical relays, and the precise details of this and other embodiments are not disclosed because they would be apparent to one skilled in the art.

The above description of a preferred embodiment of this invention is given by way of example only and numerous modifications can be made therein without departing from the scope of this invention as claimed in the following claims.

I claim:

1. In an automatic liquid scintillation counting system which includes
   a sample transfer station;
   conveying apparatus for removably storing a plurality of liquid scintillation samples and transporting said samples in seriatim order to said sample transfer station; said samples being arranged on said conveying apparatus in groups such that a first-to-be-counted sample in each group arrives first at said sample transfer station followed by the remaining samples in each said group;
   a sample counting station located at a position underneath said sample transfer station;
   sample transfer apparatus for alternately lowering a sample at said transfer station from said conveying apparatus to said counting station and raising said sample back to said conveying apparatus; and
   sample counting apparatus including means for storing a plurality of counting programs each identified by a separate program number and each determining at least the discriminator levels, the preset condition for terminating counting, and the low count reject limit, and means for counting a sample at said counting station in accordance with one of said counting programs;
   improved sample group programming apparatus comprising:
   indicating means, including a support structure adapted to be removably mounted on said conveying apparatus and constructed to cover substantially one of said first-to-be-counted samples, for indicating a preselected one of said program numbers, and coding means comprising a preselected number greater than one of light opaque and light transmissive portions arranged in a regular pattern within a pluarlity of groups equal in quantity to the number 2 raised to the power equal to the aforesaid preselected number to define a sequence of binary coded decimal numbers each comprising the aforesaid preselected number of binary digits; and reading means mounted in a reading position relative to said sample transfer station operative to read said preselected program number on said indicating means when it arrives at said reading position and to signal said preselected program number to said sample counting apparatus.

2. Apparatus as claimed in claim 1, wherein said coding means is mounted on said support structure such that each of said groups may be selectively indexed to a preselected operate location on said support means; and said indicating means further includes:

light conducting means mounted in said support means operative to transmit light from a preselected remote location on said support means to said operate location;

and wherein said reading means comprises:

a light source;

a number of light responsive elements equal to said selected number of binary digits; and a second support structure supporting said light source and said light responsive elements in prearranged positions such that said light source illuminates said light conducting means and said light responsive elements are selectively responsive to light emanating from separate light transmissive portions of said coding means in said operate position when said indicating means arrives at said reading location.

3. In an automatic liquid scintillation counting system which includes a sample transfer station;

conveying apparatus for removably storing a plurality of liquid scintillation samples and transporting said samples in seriatim order to said sample transfer station; said samples being arranged on said conveying apparatus in groups such that a first-to-be-counted sample in each group arrives first at said sample transfer station followed by the remaining samples in each said group:

a sample counting station located at a position underneath said sample transfer station;

sample transfer apparatus for alternately lowering a sample at said transfer station from said conveying apparatus to said counting station and raising said sample back to said conveying apparatus; and sample counting apparatus including means for storing a plurality of counting programs each identified by a separate program number and means for counting a sample at said counting station in accordance with one of said counting programs;

improved sample group programming apparatus comprising:

indicating means, including a support structure adapted to be removably mounted on said conveying apparatus and constructed to cover substantially one of said first-to-be-counted samples, for indicating a preselected one of said program numbers; and wherein said support structure comprises a generally hollow support member having an open end adapted to be mounted over a liquid scintillation sample and a closed end providing a horizontal mounting platform; and said indicating means further comprises:

a generally circular, substantially opaque disc rotatably mounted on said platform, said disc defining a plurality of radially arrayed binary coded number indicia in the form of the presence and absence of apertures through said disc at preselected radial distances; and a light pipe mounted in said platform and being of a configuration such as to conduct light from a remote location on said platform to a preselected area underneath said disc corresponding to an operate location whereat light will be provided to apertures comprising one of said binary coded number indicia;

reading means mounted in a reading position relative to said sample transfer station operative to read said preselected program number on said indicating means when it arrives at said reading position and to signal said preselected program number to said sample counting apparatus. and wherein said reading means comprises:

a support member extending over said conveying apparatus with a bottom portion slightly higher than the top surface of said disc;

a light source mounted in said support member to illuminate said light pipe at said remote location when said indicating means is in said reading position; and a number of light responsive elements mounted in said support member and communicating with said bottom portion, said elements being positioned to detect the presence and absence of apertures of one of said binary coded number indicia at said operate location when said indicating means is in said reading position.

4. In an automatic liquid scintillation counting system which includes a sample transfer station;

conveying apparatus for removably storing a plurality of liquid scintillation samples and transporting said samples in seriatim order to said sample transfer station; said samples being arranged on said conveying apparatus in groups such that a first-to-be-counted sample in each group arrives first at said sample transfer station followed by the remaining samples in each said group;

a sample counting station located at a position underneath said sample transfer station;

sample transfer apparatus for alternately lowering a sample at said transfer station from said conveying apparatus to said counting station and raising said sample back to said conveying apparatus; and sample counting apparatus including means for storing a plurality of counting programs each identified by a separate program number and means for counting a sample at said counting station in accordance with one of said counting programs;

improved sample group programming apparatus comprising:

a program indicating elements comprising a support structure with an open end adapted to be mounted over one of said first-to-be-counted samples in a fixed position on said conveying apparatus and a closed end forming a platform horizontally disposed over said sample; a binary coded disc defining a radially disposed array of apertures carried on said platform; a light conducting element mounted in said platform with one portion beside said disc and another portion extending under a radial portion of said disc; said disc being rotatably mounted to position selected radial portions over said light conducting member so that light from said element will be conducted through apertures in said disc defining one of a plurality of binary coded decimal numbers; and a program reading element mounted over said conveying apparatus at a location relative to said sample transfer station, said element having a horizontal support arm with a light source mounted therein at a position such as to register with said one portion of said light conducting element and a plurality of light responsive elements corresponding in number to the number of digits in said binary coded decimal numbers, said light responsive elements being mounted in said support arm in positions to detect said one binary coded decimal number in accordance with the position and number of apertures defining said number, when said program indicating element arrives under said horizontal support arm.

5. In an automatic system for measuring and counting separately the radioactive emissions from a plurality of discrete radioactive samples including a sample transfer station;

conveying apparatus for removably storing a plurality of discrete radioactive samples and transporting said samples in seriatim order to said sample transfer station; said samples being arranged on said conveying apparatus in groups such that a first-to-be-counted sample in each group arrives first at said sample transfer station followed by the remaining samples in each said group;

a sample counting station located at a position removed from said sample transfer station;

sample transfer apparatus for alternately transporting a sample at said transfer station from said conveying apparatus to said counting station and returning said sample back to said conveying apparatus; and sample counting apparatus including means for storing a plurality of counting programs each identified by a separate program number and each determining at least the discriminator levels, the preset condition for terminating counting, and the low count reject limit, and means for counting a sample at said counting station in accordance with one of said counting programs;

improved sample group programming apparatus comprising:

indicating means, including a support structure adapted to be removably mounted on said conveying apparatus and constructed to cover substantially one of said first-to-be-counted samples, for indicating a preselected one of said program numbers, and coding means comprising a preselected number greater than one of light opaque and light transmissive portions arranged in a regular pattern within a plurality of groups equal in quantity to the number 2 raised to the power equal to the aforesaid preselected number to define a sequence of binary coded decimal numbers each comprising the aforesaid preselected number of binary digits; and reading means mounted in a reading position relative to said sample transfer station operative to read said preselected program number on said indicating means when it arrives at said reading position and to signal said preselected program number to said sample counting apparatus.

6. Apparatus as claimed in claim 5, wherein said coding means is mounted on said support structure such that each of said groups may be selectively indexed to a preselected operate location on said support means; and said indicating means further includes light conducting means mounted in said support menas operative to transmit light from a preselected remote location on said support means to said operate location;

and wherein said reading means comprises:

a light source;

a number of light responsive elements equal to said selected number of binary digits; and a second support structure supporting said light source and said light responsive elements in prearranged positions such that said light source illuminates said light conducting means and said light responsive elements are selectively responsive to light emanating from separate light transmissive portions of said coding means in said operate position when said indicating means arrives at said reading location.

7. In an automatic system for measuring and counting separately the radioactive emissions from a plurality of discrete radioactive samples including a sample transfer station;

conveying apparatus for removably storing a plurality of discrete radioactive samples and transporting said samples in seriatim order to said sample transfer station; said samples being arranged on said conveying apparatus in groups such that a first-to-be-counted sample in each group arrives first at said sample transfer station followed by the remaining samples in each said group;

a sample counting station located at a position removed from said sample transfer station;

sample transfer apparatus for alternately transporting a sample at said transfer station from said conveying apparatus to said counting station and returning said sample back to said conveying apparatus; and sample counting apparatus including means for storing a plurality of counting programs each identified by a separate program number and means for counting a sample at said counting station in accordance with one of said counting programs;

improved sample group programming apparatus comprising:

program indicating elements comprising a support structure with an open end adapted to be mounted over one of sand first-to-be-counted samples in a fixed position on said conveying apparatus and a closed end forming a platform horizontally disposed over said sample; a binary coded disc defining a radially disposed array of apertures carried on said platform; a light conducting element mounted in said platform with one portion beside said disc and another portion extending under a radial portion of said disc; said disc being rotatably mounted to position selected radial portions over said light conducting member so that light from said element will be conducted through apertures in said disc defining one of a plurality of binary coded decimal numbers; and a program reading element mounted over said conveying apparatus at a location relative to said sample transfer station, said element having a horizontal support arm with a light source mounted therein at a position such as to register with said one portion of said light conducting element and a plurality of light responsive elements corresponding in number to the number of digits in said binary coded decimal numbers, said light responsive elements being mounted in said support arm in positions to detect said one binary coded decimal number in accordance with the position and number of apertures defining said number, when said program indicating element arrives under said horizontal support arm.

8. In an automatic system for measuring and counting separately the radioactive emissions from a plurality of discrete radioactive samples, including a sample transfer station;

conveying apparatus comprising a series of receptacles for removably storing a plurality of discrete radioactive samples and transporting said samples in seriatim order to said sample transfer station; said samples being arranged in receptacles on said conveying apparatus in groups such that a first-to-be-counted sample in each group arrives first at said sample transfer station followed by the remaining samples in each said group;

a sample counting station located at a position removed from said sample transfer station;

sample transfer apparatus for alternately transporting a sample at said transfer station from said conveying apparatus to said counting station and returning said sample to said conveying apparatus; and sample counting apparatus including means for storing a plurality of counting programs each identified by a separate program number and means for counting a sample at said counting station in accordance with one of said counting programs;

improved sample group programming apparatus comprising:

indicating means, including a support structure adapted to be removably mounted on any one of said receptacles in said conveying apparatus and constructed to cover substantially one of said first-to-be-counted samples, for indicating a preselected one of said program numbers; and reading means mounted in a reading position relative to said sample transfer station operative to read said preselected program number on said indicating means when it arrives at said reading position and to signal said preselected program number to said sample counting apparatus, wherein each of said receptacles in said conveying apparatus is constructed to be able to simultaneously accommodate a support structure in addition to a sample.

9. The apparatus of claim 8 further characterized in that said indicating means indicates a preselected one of said program numbers determining at least the discriminator levels, the preset condition for terminating counting, and the low level reject limit.

* * * * *

UNITED STATES PATENT OFFICE
CERTIFICATE OF CORRECTION

Patent No. 3,805,071     Dated April 16, 1974

Inventor(s) Richard B. Frank

It is certified that error appears in the above-identified patent and that said Letters Patent are hereby corrected as shown below:

Title page:  Line [73]    Assignee:  G. D. Searle & Co.,
                                     Skokie, Illinois In col. 2, line 55:  "requirement" is misspelled.

In col. 5, lines 5-10:  specification reads:  "In Fig. 2 only one aperture exists in the operate location so only one of the light responsive elements is illuminated."

Specification should read but does not:  "In Fig. 2 three apertures exist in the operate location so three of the light responsive elements are illuminated."

In col. 5, line 37:  31 should be 51.

In col. 10, line 17:  "means" is misspelled.

Signed and sealed this 29th day of April 1975.

(SEAL)
Attest:

RUTH C. MASON
Attesting Officer

C. MARSHALL DANN
Commissioner of Patents
and Trademarks